United States Patent [19]

Blondeau

[11] Patent Number: 5,082,109
[45] Date of Patent: Jan. 21, 1992

[54] HANDLING APPARATUS FOR DISPLACING, IN A SUBSTANTIALLY HORIZONTAL LONGITUDINAL DIRECTION, UNITARY LOADS RESTING ON ROLLING MEMBERS

[75] Inventor: Pierre Blondeau, Montbard, France

[73] Assignee: Societe Interroll, Venaray-Les-Laumes, France

[21] Appl. No.: 520,113

[22] Filed: May 8, 1990

Related U.S. Application Data

[63] Continuation of Ser. No. 298,185, Jan. 17, 1989, abandoned.

[30] Foreign Application Priority Data

Jan. 22, 1988 [FR] France .................. 88 00706

[51] Int. Cl.$^5$ ............................. B65G 13/06
[52] U.S. Cl. .................... 198/781; 198/790; 198/861.1
[58] Field of Search ............... 198/781, 782, 787, 790, 198/861.1; 193/35 MD, 37

[56] References Cited

U.S. PATENT DOCUMENTS

| | | | |
|---|---|---|---|
| 2,602,536 | 7/1952 | Eggleston | 198/789 |
| 2,769,515 | 11/1956 | Thomas et al. | |
| 3,035,683 | 5/1962 | Bishop | 198/861.1 X |
| 3,888,343 | 6/1975 | Snyder | 198/780 |
| 3,890,755 | 6/1975 | Specht | 198/780 X |
| 3,961,694 | 6/1976 | Murakami | 193/37 |
| 4,006,815 | 2/1977 | Werntz | 198/781 |
| 4,172,677 | 10/1979 | Gunti | |
| 4,240,538 | 12/1980 | Hawkes et al. | 198/781 X |
| 4,266,660 | 5/1981 | Herman | 198/781 |
| 4,273,239 | 6/1981 | Thwaites et al. | 198/781 |
| 4,488,639 | 12/1984 | Vogt et al. | 198/781 X |
| 4,553,931 | 11/1985 | Wachi et al. | 198/781 X |
| 4,819,787 | 4/1989 | Burkhardt | 198/781 |

FOREIGN PATENT DOCUMENTS

| | | | |
|---|---|---|---|
| 2515009 | 10/1976 | Fed. Rep. of Germany | 198/787 |
| 2742579 | 3/1979 | Fed. Rep. of Germany | 198/789 |
| 3101355 | 9/1982 | Fed. Rep. of Germany | 198/789 |
| 3408125 | 9/1985 | Fed. Rep. of Germany | 198/781 |
| 456188 | 8/1913 | France . | |
| 1469998 | 1/1967 | France . | |
| 2312428 | 12/1976 | France | 198/781 |
| 2387873 | 4/1978 | France . | |
| 0257813 | 11/1986 | Japan | 198/781 |
| 284220 | 11/1971 | U.S.S.R. | 198/786 |
| 2174966 | 11/1986 | United Kingdom | 198/786 |

Primary Examiner—D. Glenn Dayoan
Attorney, Agent, or Firm—McAulay Fisher Nissen Goldberg & Kiel

[57] ABSTRACT

A handling apparatus for displacing, in a substantially horizontal longitudinal direction, unitary loads resting on rolling members such as rollers or rolls engaged on traverse shafts driven by friction, and comprising a chassis having two parallel, vertical, lateral walls joined together, at a fixed distance constituting the width of the apparatus, with the aid of transverse crosspieces. To facilitate adaptation of the apparatus to its conditions of use and, consequently, to modify its dimensions, the walls of the chassis are constituted by wall elements assembled end to end, lengthwise of the apparatus, with bolts, so that the length of the apparatus can be rendered greater or smaller by adding or removing wall elements, the crosspieces being constituted by bars provided, at their end parts, with axial tappings into which screws are inserted passing through holes pierced in the walls, the width of the apparatus being made larger or smaller by using longer or small crosspieces.

20 Claims, 3 Drawing Sheets

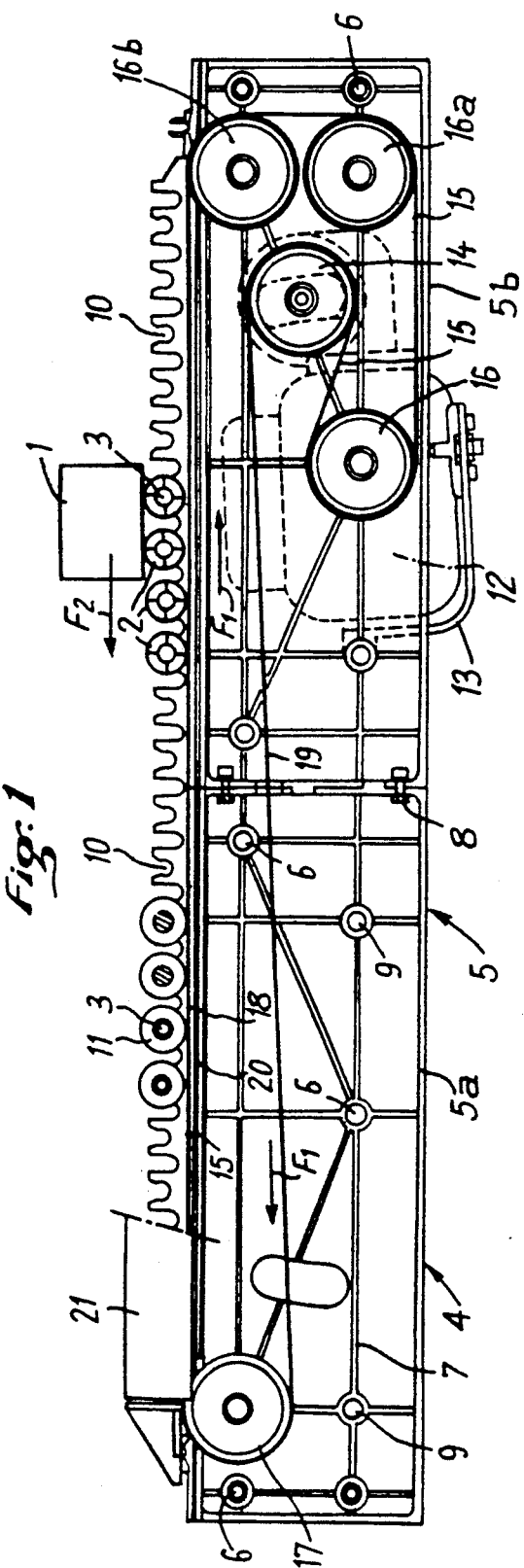

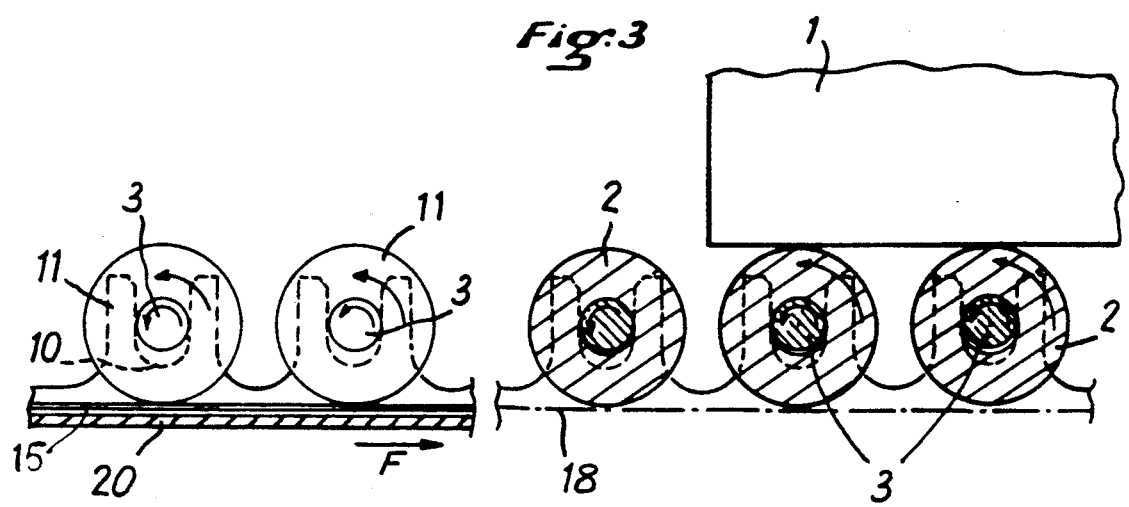
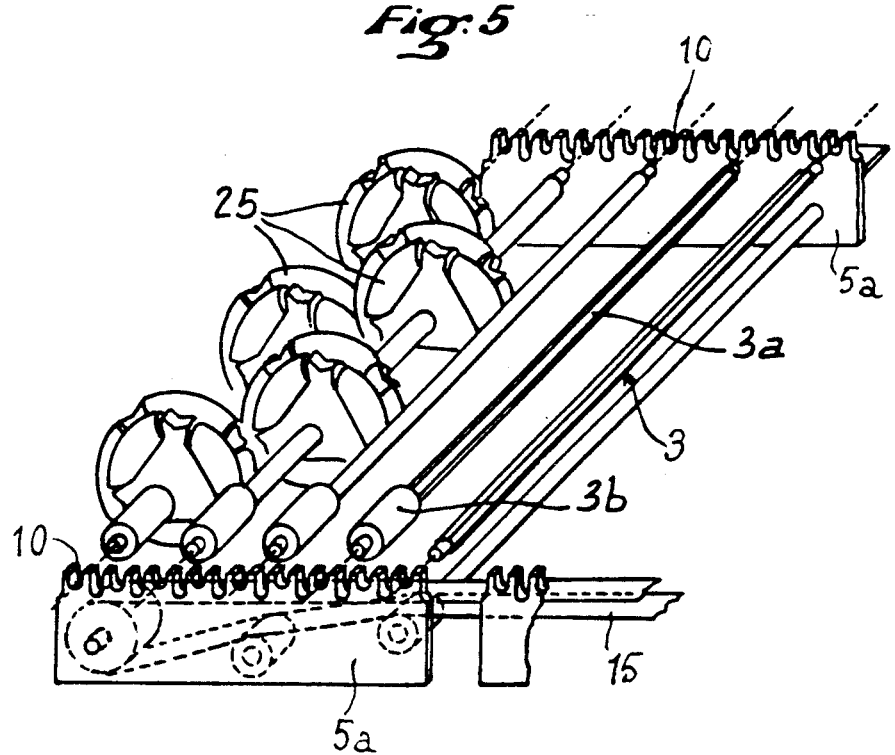

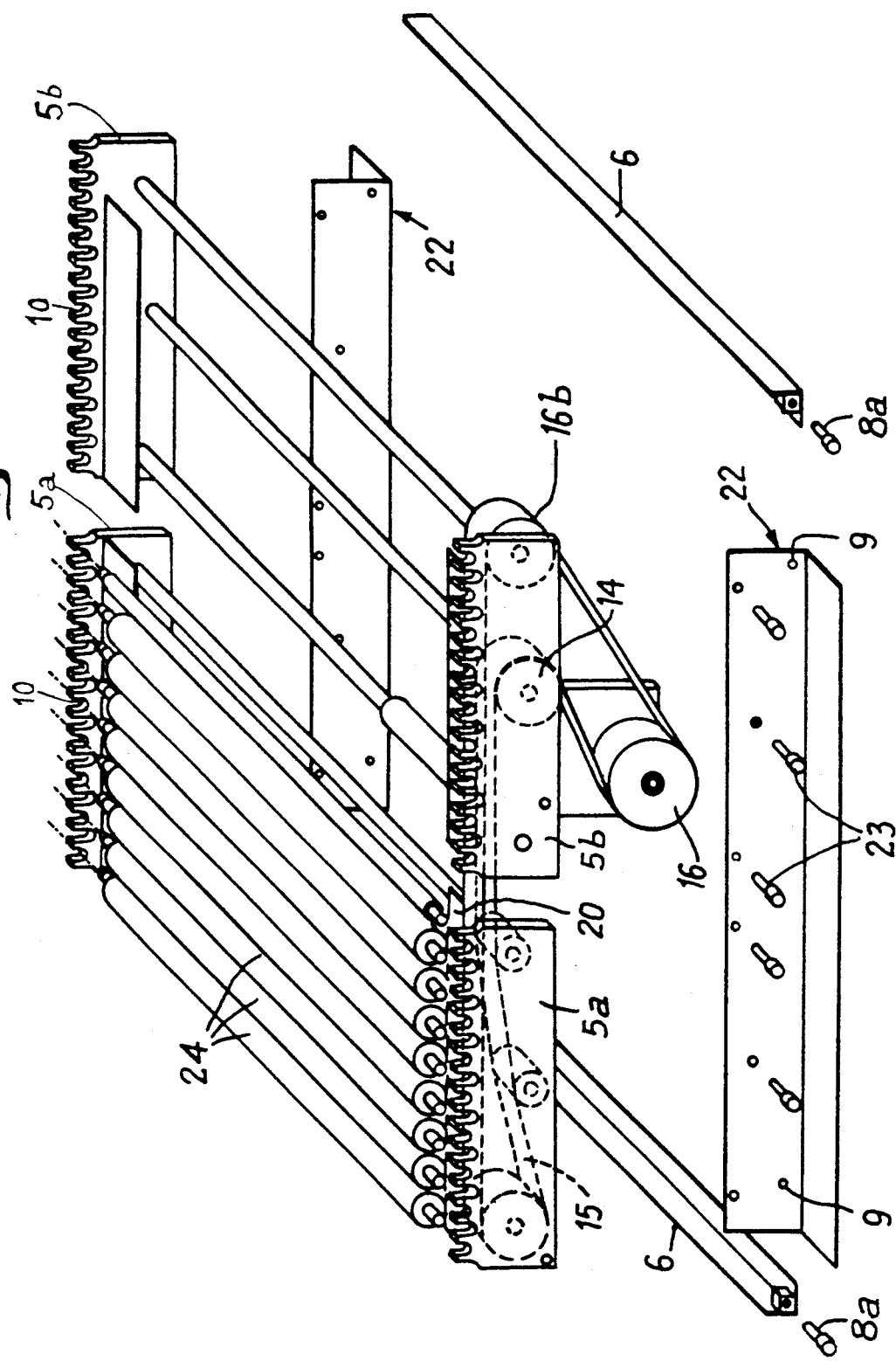

HANDLING APPARATUS FOR DISPLACING, IN A SUBSTANTIALLY HORIZONTAL LONGITUDINAL DIRECTION, UNITARY LOADS RESTING ON ROLLING MEMBERS

This application is a continuation of application Ser. No. 07/298,185, filed Jan. 17, 1989 now abandoned.

FIELD OF THE INVENTION

The present invention relates to a handling apparatus for displacing, in a substantially horizontal longitudinal direction, unitary loads resting on rolling members such as rollers or rolls engaged on transverse shafts driven by friction, the apparatus comprising a chassis comprising two parallel, vertical, lateral walls joined together, at a fixed distance constituting the width of the apparatus, with the aid of transverse crosspieces.

BACKGROUND OF THE INVENTION

Apparatus of this type are already known, which present the drawback of being of fixed length and width. If the displacement changes due to the constraints imposed by use or if, due to these same constraints, the loads to be displaced change dimensions, one must make changes in the apparatus available or change the apparatus completely, with the inherent inconvenient consequences.

SUMMARY OF THE INVENTION

In order to overcome these drawbacks, the invention provides an apparatus characterized by having walls of its chassis constituted by wall elements assembled end to end, lengthwise of the apparatus, with bolts, the length of the apparatus can be made greater or smaller by adding or by removing wall elements, the crosspieces being constituted by bars provided, at their end parts, with axial tappings in which are mounted screws passing through holes pierced in the walls, the width of the apparatus being made longer larger or smaller by using or shorter crosspieces.

According to another feature of the invention, each wall element bears, on its upper longitudinal edge, over the whole of its length, a succession of equidistant recesses, in the form of an upwardly open U, in which are freely engaged the end parts of the shafts on which are mounted the rollers or rolls.

This apparatus firstly presents the advantage of being adaptable both to the distance of transport imposed by the constraints of the exploitation and to the width of the loads to be displaced with the aid of this apparatus. The apparatus is modular, it may be mounted and dismantled, extended or shortened, rendered wider or narrower, depending on use requirements.

The apparatus also presents the advantage that the power necessary for drive thereof is very low, as only the rollers or rolls lying beneath a load require a greater moment of transport, this moment being virtually proportional to the weight of the load. Another advantage of the apparatus is that it may be very easily cleaned since the shafts may be raised very easily and disengaged from the U-recesses in which their end parts are freely engaged.

BRIEF DESCRIPTION OF THE DRAWINGS

The invention will be more readily understood on reading the following description with reference to the accompanying drawings, in which:

FIG. 1 is a schematic view in elevation, partially in section, with the cover removed, of the apparatus of the invention.

FIG. 2 is a schematic partial plan view of the same apparatus.

FIG. 3 is a view in partial vertical and longitudinal section, on a larger scale, of the upper part of the apparatus.

FIG. 4 is an exploded view in perspective of another embodiment of the apparatus according to the invention.

FIG. 5 is an exploded view in perspective of another embodiment of the apparatus according to the invention.

DETAILED DESCRIPTION OF THE DRAWINGS

Referring now to the drawings, the apparatus shown in FIGS. 1 to 3 is a handling apparatus for displacing in a horizontal direction or one inclined with respect to the horizontal by a very small angle upwardly or downwardly, unitary loads 1 resting on rollers 2, mounted freely on transverse shafts 3. These rollers 2 have an inner diameter very slightly greater than the outer diameter of the shafts 3, as may be seen in FIG. 3, so as not to be normally driven in rotation and, as will be described in detail hereinafter, to be so by friction, only when a load 1 is in abutment thereon due to the weight of this load 1. This load is shown being advanced from one of the ends of the apparatus, or rear end, towards the opposite part thereof, or front end.

The apparatus is constituted by a chassis 4 comprising two parallel and vertical lateral walls 5, joined together at a fixed distance, constituting the width of the apparatus, with the aid of crosspieces 6.

The walls 5, advantageously made of moulded plastics material, are provided with ribs 7 for consolidation of the apparatus and they are constituted by identical elements, assembled lengthwise with bolts 8. In the non-limiting embodiment shown in the drawings, each lateral wall 5 is constituted solely by two elementary front and rear walls 5a and 5b respectively, but the length of the apparatus may be increased by adding intermediate elementary walls between the two front and rear walls 5a and 5b. The crosspieces 6 are bars which can be cylindrical, provided at their ends with axial tappings, in which are inserted screws 8a. The screws 8a of the crosspieces 6, before being screwed in the respective tappings, pass through holes 9 made for the purpose of assembling the apparatus in the elementary walls 5a, 5b. The width of the apparatus may be rendered larger or smaller by using more or less long crosspieces 6.

The elementary front and rear walls 5a and 5b, as well as optional intermediate walls, bear on their upper edge, over their entire length, a succession of equidistant recesses 10 in the form of an upwardly open U. In the recesses 10 are freely engaged the end parts of the shafts 3 on which the rollers 2 are fitted for free rotation. Each shaft 3 bears, at one of its end parts, a drive roller 11, force-fitted in order to be fast in rotation with this shaft (FIG. 2). The shafts 3 are of the same length as the crosspieces 6 and they are provided with an appropriate number of identical rollers 2, in a number sufficient to cover the whole length of the shaft 3 between the walls 5, depending on the width of the apparatus. This arrangement is particularly advantageous as it enables the apparatus to be easily cleaned: in fact, it suffices to raise each shaft 3, with its rollers 2, in order to disengage it from its two recesses 10, this operation not requiring any tool.

The driving means for the apparatus, housed between the two elementary rear walls 5b, is constituted by a motor 12, preferably electric, provided with a reduction gear, borne by a support 13 mounted to tilt. The gear motor assembly 12 is mounted between the rear walls 5b, within the apparatus, in order to be protected, and it supports at the end of its driven shaft 12a, outside the elementary rear wall 5b located to the left in FIG. 2, considering the direction of advance of the loads 1 from right to left, a drive roller, 14, over which passes a flat endless belt 15, of small width. This endless drive belt 15 of the apparatus passes over three guide pulleys 16, 16a, 16b mounted to rotate on spindles borne by the left rear wall 5b traversed by the driven shaft 12a of the gear motor 12 and over a guide pulley 17 mounted to rotate on the front left wall 5a of the apparatus. The belt 15 consequently comprises two sides, i.e. an upper side 18 moving from the front to the rear of the apparatus, and a lower side 19 moving from the rear to the front of the apparatus, as indicated in FIG. 1 by arrows F1. The upper side 18 of the belt 15 slides on an upper horizontal flange 20 projecting outwardly from the walls 5a, 5b and performing the role of slideway for supporting this upper side of the belt. As the shafts 3 rest in recesses 10, in the immediate proximity of their bottoms, the drive rollers 11 are in abutment on the upper side 18 of the belt 15 (FIG. 1) which slides in abutment on the flange 20, and they are driven in rotation, like shafts 3, in anti-clockwise direction, the rollers 2 remaining, however, immobile, as shown in FIG. 3. When the load 1 passes above rollers 2 borne by a shaft 3, the force of abutment of the drive roller 11 of this shaft on the upper side 18 of the belt 15 is increased by the weight of the load and furthermore the rollers 2, pressed more against the shaft 3 by the weight of the load, are then driven in rotation in anti-clockwise direction (FIG. 3), by friction. The load 1 is therefore advanced, by the successive rows of rollers 2, along the apparatus, from its rear part towards its front part in the direction of arrow F2. The drive roller 14, the rear guide pulleys 16, 16a, 16b and the front guide pulley 17 are disposed outside the rear wall 5b of the apparatus and consequently the same applies to the belt 15 and the flange 20 for slide of the upper side 18 of the belt. A cover 21 is therefore provided to protect these members outside the apparatus and also to protect against any possible accident any persons who approach these parts during operation of the apparatus. The cover 21 may be simply suspended from hooks in order to be dismountable without requiring tools.

Assembly of the gear motor 12 on a tilting support furnishes an effort of self-tension of the belt 15.

The crosspieces 6 and the shafts 3 are preferably made of stainless steel, whilst the lateral walls 5a, 5b of the chassis 1, the rollers 2, 11, 14, the pulleys 16, 16a, 16b, 17 and the cover 21 are made of injected plastics material with very high mechanical characteristics.

In the embodiment shown in FIG. 4, the two elementary front and rear walls 5a and 5b are fixed, in line with each other, to the vertical flange of a lower longitudinal angle iron 22 constituting a base of the apparatus. Fixation is ensured by means of transverse screws 23. The two lower angles 22 are assembled by transverse crosspieces 6, fixed at their ends to the angles 22 by means of screws 8a. In this embodiment, the upper horizontal flange 20 over which slides the upper side 18 of the belt 15, extends inwardly, from each front and rear elementary vertical wall 5a and 5b. Each of these walls 5a, 5b is made by a one-piece block of moulded plastics material comprising the vertical wall proper, the inwardly extending, upper horizontal flange 20 and, along the upper edge of the wall, the succession of the recesses 10 receiving the ends of the shafts 3. In the apparatus shown in FIG. 4, the rollers 2 of the apparatus of FIG. 1 have been replaced by transverse rolls of small diameter, for example 22 mm, whose length corresponds to the width of the apron desired for the apparatus. Each roll is mounted on its shaft 4 in the same manner as rollers 2 in the case of the embodiment of FIGS. 1 and 2. In this case, the left end part of each roll 24 performs the role of the drive roller 11, by abutting, under the effect of its own weight, on the upper side 18 of the belt 15. In this way, each roll 24 supporting a load 1 is driven in rotation in anti-clockwise direction under the effect of its own weight and the weight of the load 1.

In the embodiment shown in FIG. 5, each shaft 3 has, over the greater part of its length 3a, a polygonal cross section, for example hexagonal, and this part 3a of hexagonal cross section is in mesh with the hexagonal bores, of the same dimensions, of a plurality of omnidirectional rollers 25 distributed along part 3a of the shaft 3. At its end which is located above the upper side 18 of the belt 15, the shaft 3 has cylindrical part 3b serving as drive roller for rotating the shaft 3. The apparatus shown in FIG. 5 offers the advantage that the loads 1 which are displaced longitudinally may also be pushed transversely over the omnidirectional rollers 25 so that a belt made with such omnidirectional rollers may be used as a transfer element.

What is claimed is:

1. A modular unit handling apparatus for moving unitary loads in a substantially horizontal longitudinal direction, comprising a modular structure adapted for connection with other modular structures of the same type in either its longitudinal direction of movement of loads or in a direction transverse to the movement of loads, each said modular structure including:

rolling members, said unitary loads resting on said rolling members, and means for driving said rolling members including endless drive belt means operatively associated with said rolling members by pressure exerted on said rolling members responsive to engagement with said unitary loads carried by said rolling members;

a gear motor for driving said endless drive belt means and rotating said rolling members;

shafts having end sections, said rolling members being mounted freely on said shafts and each said shafts including sufficient roller members therefore between said lateral walls, according to the width of said apparatus;

chassis means including two parallel and vertical, lateral walls and crosspieces for joining said parallel lateral walls together at a distance forming a width of said chassis means said shafts, being rotationally mounted on said chassis means;

said shafts supporting said rolling members being rotationally mounted with respect to said chassis and the driving of said rollers being effected by the friction existing between said driving shaft and said rollers resting directly thereon;

said parallel lateral walls including modular wall elements assembled end to end lengthwise of the apparatus by bolts so that the length of the apparatus may be made larger or smaller by adding or removing lateral walls;

said crosspieces including bars provided at their ends with axial tappings for receiving screws passing through holes pierced in said parallel lateral walls, whereby the width of the apparatus is made larger or smaller by using longer or shorter lengths of said crosspieces;

each said wall element on its upper longitudinal edge thereof and over its whole length having a succession of adjacent recesses;

each said recess being formed as an upwardly open U; and said end sections of said shafts on which said rolling members are mounted being freely engaged in said open U; and said endless drive belt means extending along one of said lateral walls.

2. The apparatus of claim 1, wherein each said shaft comprises a drive roller for each said shaft force-fitted thereon and in contact with an upper side of said drive belt means for rotation of said shaft.

3. The apparatus of claim 1, wherein each said shaft has along a greater part of the length thereof a polygonal cross-section, and each of said rolling members include a plurality of omnidirectional rolls, one for each said shaft, each of said omnidirectional rolls having a bore of the same shape as said polygonal cross-section of each of said shafts, and each said roll has an end part performing the function of a drive roller and is in contact with an upper side of said drive belt means.

4. The apparatus of claim 1, including: a drive roller force fitted onto each said shaft at said end section thereof;

guide pulleys provided at a rear and a front of said apparatus; and said endless belt means including a belt passing over said guide pulleys, said belt including a lower side and an upper side, said upper side being adapted to move from the front of said apparatus towards the rear thereof and said lower side being adapted to move from the rear of said apparatus towards the front.

5. The apparatus of claim 1, including:

a drive roller supported at each said shaft end;

guide pulleys provided at a rear and a front of said apparatus; and said endless belt means including a belt passing over said guide pulleys, said belt including an upper side and a lower side, said upper side being adapted to move from the front of said apparatus towards the rear thereof and said lower side being adapted to move from the rear of said apparatus towards the front.

6. The apparatus of claim 3 including:

a drive roller supported at each said shaft end;

guide pulleys provided at a rear and a front of said apparatus; and a belt forming part of said endless belt means passing over said guide pulleys, said belt including an upper side adapted to move from the front of said apparatus towards the rear thereof and a lower side adapted to move from the rear of said apparatus towards the front.

7. The apparatus of claim 2, including:

guide pulleys provided at a rear and a front of said apparatus;

a belt forming part of said endless belt means passing over said guide pulleys, said belt including an upper side and a lower side, said upper side being adapted to move from the front of said apparatus towards the rear thereof and said lower side being adapted to move from the rear of said apparatus towards the front.

8. The apparatus of claim 1, wherein said rolling members include a single roll for each said shaft and mounted thereon, each said roll having an end part in contact with an upper side of said drive belt means for driving said shaft.

9. The apparatus of claim 1, further including a tiltable support at the rear of said apparatus, said gear motor being mounted on said support.

10. The apparatus of claim 1, wherein said adjacent recesses are of alternate depth.

11. The apparatus of claim 1, wherein said wall elements are of molded plastic.

12. The apparatus as claimed in claim 1, wherein said upwardly open U is wider than the outer diameter of said end sections to facilitate disengagement of said shafts from said recesses.

13. Handling apparatus for moving unitary loads in a substantially horizontal longitudinal direction, comprising:

in combination, rolling members, said unitary loads resting on said rolling members;

shafts having end sections, said rolling members being mounted freely on said shafts and each of said shafts includes sufficient roller members to cover the whole length of each of said shafts between said lateral walls, according to the width of said apparatus;

chassis means including two parallel and vertical, lateral walls and crosspieces for joining said lateral walls together at a distance forming a width of said chassis means;

said lateral walls including modular wall elements assembled end to end lengthwise of the apparatus by bolts so that the length of the apparatus may be made larger or smaller by adding or removing lateral walls;

said crosspieces including bars provided at their ends with axial tappings for receiving screws passing through holes pierced in said lateral walls, whereby the width of the apparatus is made larger or smaller by using longer or shorter lengths of said crosspieces, whereby to enable the handling apparatus to be rendered larger or small by using different ones of said crosspieces, and said apparatus can be rendered wider or narrower, extended or shortened;

each said wall element on its upper longitudinal edge thereof and over its whole length being provided with a succession of adjacent recesses;

each said recess being formed as an upwardly open U; and said end sections of said shafts on which said rolling members are mounted being freely engaged in said open U, whereby to permit said shafts to be easily disengaged from said U for cleaning; and endless drive belt means operatively associated with said rolling members extending along one of said lateral walls, and a gear motor for driving the endless belt means and rotating said rolling members.

14. The apparatus of claim 13, wherein:

each said wall element on its upper longitudinal edge thereof and over its whole length is provided with a succession of equidistant recesses;

each said recess is formed as an upwardly open U; and said end sections of said shafts on which said rolling members are mounted are freely engaged in said open U, whereby to permit said shafts to be easily disengaged from said U for cleaning.

15. The apparatus of claim 13, including endless drive belt means operatively associated with said rolling members extending along one of said lateral walls, and a gear motor for driving said endless drive belt means and rotating said rolling members.

16. The apparatus of claim 13, wherein each said shaft has along a greater part of the length thereof a polygonal cross-section, and each of said rolling members include a plurality of omnidirectional rolls, one for each said shaft, each of said omnidirectional rolls having a bore of the same shape as said polygonal cross-section of each of said shafts, and each said roll has an end part performing the function of a drive roller and is in contact with an upper side of said drive belt means.

17. The apparatus of claim 13, wherein:
one of said end sections of said shaft has a shaft end;
a drive roller supported at each said shaft end by said motor;
guide pulleys provided at a rear and a front of said apparatus; and
a belt forming part of said endless belt means passing over said guide pulleys, said belt including an upper side adapted to move from the front of said apparatus towards the rear thereof and a lower side adapted to move from the rear of said apparatus towards the front;
said lateral walls each having an upper horizontal flange projecting towards either an outside or an inside of said apparatus.

18. The apparatus of claim 13, wherein said rolling members include a single roll for each said shaft and mounted thereon, each said roll having an end part in contact with an upper side of said drive belt means for driving said shaft.

19. The apparatus of claim 13, including drive rollers coupled with said shafts and adapted to be in abutment with said endless belt drive means only when said unitary loads rest on said rolling members.

20. The apparatus of claim 13, wherein said rolling members have an inner diameter slightly greater than the outer diameter of said shafts, said shafts being driven by said rolling members only when said unitary loads are in abutment with said rolling members, thereby to be driven by frictional engagement between said rolling members and said shafts.

* * * * *